United States Patent Office 3,222,277
Patented Dec. 7, 1965

3,222,277
REMOVAL OF IRON FROM WATER
Ronald S. Joyce, Pittsburgh, Pa., assignor to Pittsburgh Activated Carbon Company, Pittsburgh, Pa., a corporation of Pennsylvania
No Drawing. Filed Sept. 28, 1964, Ser. No. 399,846
The portion of the term of the patent subsequent to June 29, 1982, has been disclaimed
8 Claims. (Cl. 210—63)

This application is a continuation-in-part of application Serial No. 190,265, filed April 26, 1962, now U.S. Patent No. 3,192,156.

The present invention relates to the removal of iron from water.

It has been proposed previously in Shoemaker Patent 2,145,901 to remove hydrogen sulfide, iron and manganese from water by cementing manganese dioxide particles to a base of pumice, slag, coke, charcoal or zeolite. This procedure has the disadvantage that the product does not have a sufficiently high capacity for removal of the hydrogen sulfide and other contaminants of the water. Somewhat similar processes for removing hydrogen sulfide or soluble manganese and iron compounds from water are disclosed in Lawler Patent 2,355,808 and Zapffe Patent 1,990,214. It has also been proposed to add an oxidizing agent to water containing dissolved iron and to pass the solution over a bed of activated carbon to precipitate the iron, Kratz Patent 3,017,347. The oxidizing agents in Kratz are all gaseous and are added before the water is passed over the activated carbon.

It is an object of the invention to remove soluble iron compounds from water.

Another object is to remove soluble iron compounds from water by a more effective process than the use of activated carbon alone.

A further object is to remove iron compounds from water using a relatively short bed of activated carbon.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by percolating the soluble iron containing water through a bed of activated carbon impregnated with manganese dioxide to remove the iron by oxidizing its water soluble salts to insoluble iron oxide.

It is critical that the activated carbon be impregnated with the manganese dioxide and not merely coated therewith to get the outstanding iron removed which is attained by the present invention. In order to impregnate the activated carbon with manganese dioxide, it is not sufficient to merely add preformed manganese dioxide to the activated carbon. Instead, it is necessary to form the manganese dioxide in situ.

The manganese dioxide can be formed in situ on the activated carbon by passing an aqueous solution of an alkali metal permanganate, e.g., potassium permanganate or sodium permanganate, through the activated carbon. Alternatively, the activated carbon can be impregnated with an aqueous solution of manganous nitrate and heated to a temperature sufficiently high to decompose the nitrate to manganese dioxide. A third procedure is to impregnate the carbon with an aqueous solution of any soluble salt of divalent manganese, e.g., manganous sulfate or manganous chloride, and subsequently treat the impregnated carbon with an oxidizing agent, e.g., air or oxygen. By this procedure it is possible to impregnate the activated carbon with a large amount of manganese containing material in a very finely divided state. As a net result, the activated carbon not only has a higher capacity but there is a more rapid rate of oxidation than can be obtained with zeolites. Thus, the impregnated carbon can contain from 10 to 40% by weight total manganese material calculated as Mn and from 10 to 40% of manganese dioxide. Activated carbon containing smaller amounts of manganese dioxide can be used but does not have as high a capacity.

The manganese dioxide impregnated carbon will remove any concentration of iron from the water from a fraction of one p.p.m., e.g., 0.2 p.p.m. up to a concentrated solution of iron compounds, e.g., 10,000 p.p.m. or more.

The effluent from the manganese dioxide impregnated activated carbon bed can be passed through a cation exchange water softener, if desired, to remove water soluble manganese compounds present, e.g., due to the conversion of a portion of the manganese dioxide to water soluble manganous ions.

The cation exchange water softener can be a synthetic or natural inorganic zeolite, sulfonated coal or a cation exchange resin such as sulfonated styrene-divinyl benzene copolymer, sulfonated phenol-formaldehyde resin or carboxylic acid resins such as ethylene glycol dimethacrylate-methacrylic acid copolymer. The cation exchange material is normally employed in the form of the sodium salt.

The activated carbon is generally between 4 and 325 mesh size but can be of larger or smaller size.

Unless otherwise indicated all parts and percentages are by weight.

While the purification process can be carried out under acid or alkaline conditions it is preferably carried out with water that has been rendered neutral or acid, e.g., to a pH of 4.5 or 5.0–5.3 or 7 in order to avoid the precipitation of iron prematurely which can take place under alkaline conditions, e.g., a pH of 8 or above.

It has been found that the presence of hardness in water, whether temporary or permanent does not adversely affect the iron removal. Iron can also be removed from soft water.

*Example*

An aqueous solution containing 1.9% of potassium permanganate was passed through activated carbon (12 x 30 mesh) until the carbon had a total manganese content of 15% and a manganese dioxide content of 11%.

Soluble iron containing water was then passed at a rate of 2.5 gallons/min./cu. ft. through columns, 2.5 cm. diameter, containing the manganese dioxide impregnated activated carbon to a depth of 66.5 cm. Four different water samples were used in the tests. These samples had the properties indicated in Table 1.

TABLE 1

| Sample | Influent specifications | | |
|---|---|---|---|
| | pH | Hardness (p.p.m.) | Fe (p.p.m.) |
| 1 | 8.0 | 25 | 2.5 |
| 2 | 5.4 | 250 | 2.5 |
| 3 | 5.4 | 25 | 10 |
| 4 | 8.0 | 250 | 10 |

The results after 26 hours on stream are shown in the following Table 2.

TABLE 2

| Sample | Effluent specifications | | |
|---|---|---|---|
| | pH | Mn (p.p.m.) | Fe (total) p.p.m. |
| 1 | 7.9 | 0.34 | 0.24 |
| 2 | 6.8 | 5.7 | 0.01 |
| 3 | 7.6 | 0.36 | 0.01 |
| 4 | 7.2 | 0.58 | 0.45 |

The process of the present invention can be employed with any water soluble iron containing water. The water can also contain hydrogen sulfide, in which case the hydrogen sulfide will also be removed as set forth in my parent application. Alternatively, the water can be hydrogen sulfide free.

What is claimed is:

1. A process of removing dissolved iron from water containing the same comprising passing the water through activated carbon particles impregnated with manganese dioxide which has been formed in situ.

2. A process according to claim 1 wherein the water employed is substantially free of hydrogen sulfide.

3. A process according to claim 1 wherein the water employed has a pH of below 8.

4. A process according to claim 3 wherein the water has a pH of 4.5 to 7.

5. A process according to claim 1 wherein the manganese dioxide has been formed by passing a solution of a permanganate of an alkali metal having an atomic weight below 40 through the activated carbon.

6. A process according to claim 1 wherein the activated carbon contains between 10 and 40% manganese dioxide.

7. A process according to claim 1 wherein the water contains iron in an amount up to 10,000 p.p.m.

8. A process according to claim 1 wherein the water contains iron in an amount up to 10 p.p.m.

References Cited by the Examiner
UNITED STATES PATENTS
2,145,901   2/1939   Shoemaker _____ 252—176

MORRIS O. WOLK, *Primary Examiner.*

E. G. WHITBY, *Assistant Examiner.*